US011480853B2

(12) United States Patent
Kosidlo et al.

(10) Patent No.: US 11,480,853 B2
(45) Date of Patent: Oct. 25, 2022

(54) HEATING DEVICE FOR A CAMERA LENS

(71) Applicant: SMR Patents S.à.r.l., Luxembourg (LU)

(72) Inventors: Urszula Kosidlo, Korntal-Münchingen (DE); Romeo Wieczorek, Esslingen (DE)

(73) Assignee: SMR Patents S.à.r.l, Luxembourg (LU)

( * ) Notice: Subject to any disclaimer, the term of this patent is extended or adjusted under 35 U.S.C. 154(b) by 214 days.

(21) Appl. No.: 16/876,951

(22) Filed: May 18, 2020

(65) Prior Publication Data

US 2020/0278592 A1 Sep. 3, 2020

Related U.S. Application Data

(63) Continuation-in-part of application No. 15/913,060, filed on Mar. 6, 2018, now Pat. No. 10,656,501.

(30) Foreign Application Priority Data

Mar. 6, 2017 (EP) ..................................... 17159418

(51) Int. Cl.
*G02B 7/02* (2021.01)
*G03B 17/55* (2021.01)
*H04N 5/225* (2006.01)

(52) U.S. Cl.
CPC ........... *G03B 17/55* (2013.01); *H04N 5/2252* (2013.01); *H04N 5/2254* (2013.01)

(58) Field of Classification Search
CPC .. G03B 17/55; H04N 5/22521; H04N 5/2252; G02B 27/0006; H05B 3/06; H05B 3/12; B60R 2300/80

USPC ........................................................ 359/820
See application file for complete search history.

(56) References Cited

U.S. PATENT DOCUMENTS

| 2006/0108352 A1 | 5/2006 | Fernandex |
| 2008/0013195 A1 | 1/2008 | Fahlbusch et al. |
| 2014/0221743 A1 | 8/2014 | Sugiyama |
| 2015/0160536 A1 | 6/2015 | Lang et al. |
| 2015/0382403 A1 | 12/2015 | Philip et al. |
| 2016/0334619 A1 | 11/2016 | Nakai et al. |

FOREIGN PATENT DOCUMENTS

| DE | 10033472 A1 | 1/2002 |
| DE | 10340900 A1 | 3/2005 |
| JP | H11 32985 A | 2/1999 |
| JP | 2016 197513 A | 11/2016 |
| JP | 2016197513 A | 11/2016 |

OTHER PUBLICATIONS

European Search Report dated Aug. 18, 2017 of EP 17159418.7-1903.
Extended European Search Report dated Aug. 18, 2017 of EP 17159418.7-1903.

*Primary Examiner* — William Choi
(74) *Attorney, Agent, or Firm* — Jones Day

(57) ABSTRACT

A heating device for a lens of a camera includes at least one body including at least one conductive material, the at least one body forming at least one of a transparent coating, a non-transparent coating, a free standing film, a paint, or a bulk composite material, and at least two electrical contacts contacting the conductive mass for applying an electrical voltage to the conductive mass, the at least two electrical contacts being at least one of injection-molded onto the body and injected into the body.

36 Claims, 4 Drawing Sheets

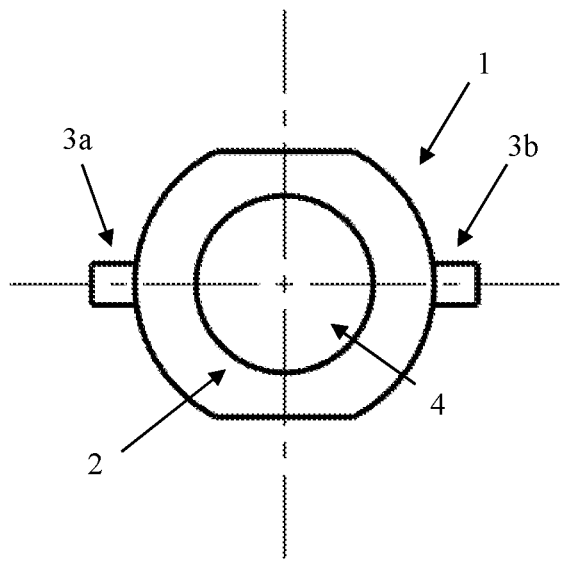
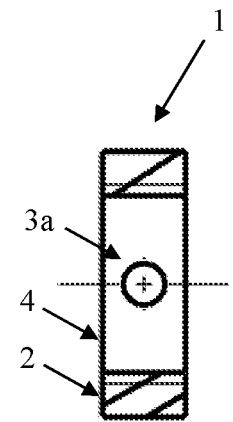
Fig. 1A
Fig. 1B
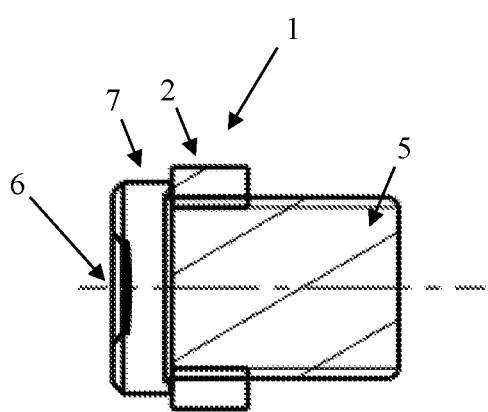
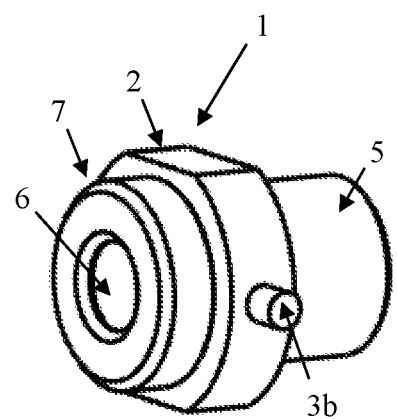
Fig. 1C
Fig. 1D

HEATING DEVICE FOR A CAMERA LENS

CROSS-REFERENCE TO RELATED APPLICATION

This application is a continuation-in-part of U.S. patent application Ser. No. 15/913,060, filed Mar. 6, 2018, which claims the benefit of foreign priority to European Patent Application No. EP 17 159 418.7, filed Mar. 6, 2017, each of which is incorporated herein by reference in its entirety for all purposes.

BACKGROUND

1. Field of the Invention

The following description relates to a heating device for a lens of a camera. The heating device may include at least one body including at least one matrix material and at least one conductive material, the conductive material being dispersed in the matrix material to form a conductive mass, and at least two electrical contacts contacting the conductive mass for applying an electrical voltage to the conductive mass. A system may include such a heating device and a camera, a rear view display device for a vehicle may include such a heating device or such a system, and a vehicle may include such a rear view display device.

2. Related Art

Typically, vehicles' camera based systems are becoming increasingly popular. These vehicles often employ vision systems where the images of cameras on the left-hand side, right-hand side, the front and the back of the vehicle are presented to the driver. This may be used instead of or in addition to employing conventional mirrors.

The respective cameras are usually located in protective housings arranged on the outside of the vehicle, and/or in housings of externally mounted components, such as the housings of the rear view mirrors. Therefore, the cameras are exposed to a variety of weather conditions. When the outside temperatures are low, or the humidity changes, condensation may form on the camera lens which adversely affects the proper functioning of the camera. In extreme cases a layer of frost crystals might build up on the camera lens which may eventually destroy the camera lens, if not removed in due time before.

Therefore, the cameras and/or the lenses of the cameras are usually heated by appropriate heating elements to avoid malfunctioning due to adverse weather conditions. The heating device may generally be used as an interior element in the camera or may be used exteriorly on the housing of the camera. Both the use of known interior and exterior heating devices has its disadvantages. For example, German Patent Application No. DE 103 40 900 A1 describes a camera system having a heating element integrated in a cover glass of the camera lens. In United States Patent Application Publication No. 2015/0160536 A1, a camera is described having a heating element installed inside the camera housing. In these systems the heating element is inflexible and cannot be easily adapted to the design requirements or the heating properties necessary to achieve the best heating result. Also, an unequal heating is achieved due to the design and materials used in these systems.

A different approach is described in German Patent Application No. DE 100 33 472 A1 where a plurality of heating elements are arranged in an elastic support element that can be clamped around the housing of a camera. However, this particular solution has the disadvantage that the elastic support can be come off when the camera is subjected to vibrations, for example vibrations that may arise when a vehicle comprising the camera is driving. Also, the use of many heating elements that are interconnected by wiring makes the heating system rather complex and susceptible to faults. Another disadvantage is the unequal heating of the camera housing that is due to the arrangement of the individual heating elements in the elastic support. Also, the elastic support dissipates some of the heat which in turn reduces the efficiency factor of the system. The heat dissipation also leads to early wear of the elastic material used in the elastic support.

Therefore, in at least one aspect, improved heating devices can be used to provide a robust and adaptable heating device that overcomes the above mentioned disadvantages, among others. For example, fewer parts can be universally used with different cameras to provide a high level of efficiency.

SUMMARY

This Summary is provided to introduce a selection of concepts in a simplified form that are further described below in the Detailed Description. This Summary is not intended to identify key features or essential features of the claimed subject matter, nor is it intended to define the scope of the claimed subject matter.

In an aspect, a heating device for a lens of a camera, includes at least one body including at least one conductive material, wherein the at least one body forms at least one of a transparent coating, a non-transparent coating, a free standing film, a paint, or a bulk composite material; and at least two electrical contacts contacting the conductive mass for applying an electrical voltage to the conductive mass, where the at least two electrical contacts are at least one of injection-molded onto the body and injected into the body.

The heating device may further include a lens holder which is provided as at least one of an injection molded single unit with the heating device body or a separate unit attached to the heating device body.

The electrical contacts may project from a side of the body opposite to a lens holder of the body.

The conductive material may be a heating wire which is at least one of injection molded onto the body or injected into the body.

The heating device may further include a coating including an electrically insulating layer applied to a surface of a lens holder of the body.

A lens holder of the body may include a tubular shape with at least one of a lens barrel and multiple individual lenses arranged along the lens holder.

The conductive material may be a heating wire which is a molded interconnect device (MID) provided by at least one of Laser Direct Structuring (LDS), hot stamping, and selective metallization.

The conductive material may include carbon fibers, graphite, carbon nanotubes, carbon nanohorns, carbon black, graphene, graphene nanoplatelets, metal particles, conductive polymers, or mixtures thereof, and is dispersed in the matrix material, the matrix material and the conductive material forming an essentially homogenous conductive mass.

The heating device may be adapted to be added directly to a glass element of the lens, or wherein the heating device is adapted to be added to a non light-transmissive part of the lens.

The heating device may be adapted to be removably attached to a housing of the camera.

The conductive material may be distributed substantially equally inside the body, or more conductive material may be distributed near regions where the two electrical contacts are arranged compared to other regions of the body.

In another aspect, a heating device for a lens of a camera includes at least one body with a two-component material including an electrically conducting layer and a thermally conducting layer being in contact with at least one of the lens, the housing of the camera, and a lens holder holding the lens; and at least two electric contacts contacting the electrically conductive material for applying an electric voltage thereto.

The heating device may further include a lens holder which is provided as at least one of an injection molded single unit with the heating device body or a separate unit attached to the heating device body.

The electrical contacts may project from a side of the body opposite to a lens holder of the body.

The conductive material may be a heating wire which is at least one of injection molded onto the body or injected into the body.

The heating device may further include a coating including an electrically insulating layer applied to a surface of a lens holder of the body.

A lens holder of the body may include a tubular shape with at least one of a lens barrel and multiple individual lenses arranged along the lens holder.

The conductive material may be a heating wire which is a molded interconnect device (MID) provided by at least one of Laser Direct Structuring (LDS), hot stamping, and selective metallization.

The conductive material may include carbon fibers, graphite, carbon nanotubes, carbon nanohorns, carbon black, graphene, graphene nanoplatelets, metal particles, conductive polymers, or mixtures thereof, and is dispersed in the matrix material, the matrix material and the conductive material forming an essentially homogenous conductive mass.

The heating device may be adapted to be added directly to a glass element of the lens, or wherein the heating device is adapted to be added to a non light-transmissive part of the lens.

The heating device may be adapted to be removably attached to a housing of the camera.

The conductive material may be distributed substantially equally inside the body, or more conductive material may be distributed near regions where the two electrical contacts are arranged compared to other regions of the body.

In another aspect, a heating device for a lens of a camera includes at least one body including at least one matrix material and at least one conductive material, where the conductive material is dispersed in the matrix material to form a conductive mass; and at least two electric contacts contacting the conductive mass for applying an electric voltage to the conductive mass.

The heating device can be used as an interior heating device which may be adapted to be added directly to the lens of the camera.

The heating device can be used as an exterior heating device, where the device is adapted to be removably arranged at a housing of the camera.

The at least one conductive material may be any material that is capable of providing the necessary electron movement so that an electric current can flow. The conductive material may include carbon fibres, graphite, carbon nanotubes, carbon nanohorns, carbon black, graphene, graphene nanoplatelets, metal particles, conductive oxides, conductive polymers, or mixtures thereof. Other conductive materials suitable for the purpose of heating in the context of the present invention will be known to the skilled person.

The conductive material can be used in various forms, such as, but not limited to, fibers, tubes, spheres, flakes, whiskers and the like. Either one specific form of a conductive material can be used or mixtures of different forms thereof. The conductive material may be used in any size suitable. The conductive material may be dispersed substantially equally in the matrix material, so that a homogenous heating effect can be achieved. Preferably the matrix material and the conductive material form an essentially homogenous conductive mass. It is also possible to provide an uneven distribution of the conductive material in the matrix material so that depending of the design and use of the heating element an optimal heating effect can be obtained.

For example, in one example, more conductive material may be distributed near the regions where the two electric contacts are arranged compared to the conductive material distributed in the remaining body.

The term "conductive mass" is used to refer to a mass having an internal resistance that is sufficiently high for heating up the body when a voltage is applied across the two electric contacts.

The at least one matrix material may be any material that is stable at elevated temperatures and that allows that the conductive material to be evenly distributed therein or that allows a distribution of the conductive material as desired. The matrix material may be organic or inorganic. In one embodiment the organic material may be a polymeric material. Exemplary inorganic materials are ceramic materials, metals or metallic materials or glass. In one embodiment the matrix material is a polymeric material. The skilled person will be aware of suitable matrix materials.

The body can have different configurations and also different compositions of matrix material and conductive materials, to create the heating element. In one embodiment, the body can be in the form of at least one transparent coating, non-transparent coating, free standing film, paint, ink, bulk composite material or the like. Thus, according to the present invention, the body may be in the form of a liquid, a flexible material or a stiff and solid body. These forms may be particularly useful when used as an interior heating device which is to adapted to be applied directly to the lens. When used as an exterior heating device, the body is preferably in the form of a stiff and/or solid body, for example made from a bulk composite material, for example to form the housing of the heating element.

Transparent coatings can be applied directly on the lens or on an additional glass substrate to be placed between different lenses of the camera. Non-transparent coatings can be applied on a part of the lens that is not light-transmissive due to specific design requirements of the lens. Non-transparent coatings may also be applied on an additional substrate, cut into form of the not-transmissive part of the lens and placed directly on the lens. The same can be done with the free standing films, where in one embodiment the film is to be cut out in the desired shape and positioned on top of the lens. In case of a solid, i.e. more stiff body, the body may have the same shape and form of the lens to achieve a perfect fit between the two components.

The body may be prepared by conventional methods known to the skilled person, such as mixing, polymerizing, extruding and/or molding the mixture to the final body. Further components may be added, such as solvents or the like, in order to arrive at the required composition and/or form of the body.

The use of the heating element as an interior heating element, as described, allows at least for a robust and compact design, among other advantages. Further, as the design of the heating element can be adapted precisely to the design of the lens or the interior of the camera, the heat can reach the glass in an efficient way. Consequently, less energy is required to achieve the best heating result and thus less stress is put on the lens and/or the other parts of the camera.

When the housing of the lens is constructed out of a polymer material, it is possible to integrate conducting material into the bulk of the polymer and use the whole housing as the heating element.

When the heating device is used as an exterior heating device, the term "at a housing" can be used to refer to a mounting position of the heating device so that the heating device can efficiently heat the lens. Therefore, the term "at" shall be also used for referring to a mounting position on, or around the camera housing. The term "removably" can be used to refer to a way of connecting two or more items that could be undone without destroying one or both of the items.

The body may include a substantially annular opening for removably arranging the body around the housing of the camera, preferably the body is shaped like a fastening nut.

The annular opening may include connector means for connecting the body to the housing of the camera.

The connector means may include a thread in the annular opening adapted to interact with a corresponding thread on the housing of the camera, and/or at least one protrusion or groove adapted to interact with a corresponding groove or protrusion on the housing of the camera.

The thread in the annular opening may include at least in part non-conductive material for realizing the two electric contacts, or wherein the annular opening includes two protrusions or grooves for realizing the two electric contacts.

The heating device may be adapted to hold the lens of the camera. Here, the term "adapted to hold the lens" can be used to define that the heating device can have the role of the lens holder of the camera. For holding the lens, the heating device may essentially have the shape of a conventional lens holder.

The at least two electric contacts may be injection-molded onto the body, screwed onto the body, and/or injected into the body, preferably the at least two electric contacts are arranged essentially opposite each other on the body.

Here, the term "injecting" is used to refer to a process where the electric contacts are introduced into the body by means of mechanical force. For example, the electric contacts could be "injected" by means of compressed air. In case the electric contacts are injected into the body, the electric contacts could comprise at least one barbed hook for securing the electric contacts in the conductive mass.

The heating device may include at least one electrically insulating layer arranged on a surface of the body, preferably a surface of the body where the body contacts either the lens or the housing, preferably the heating device further includes a heat-conducting material, preferably a heat-conducting paste, wherein the heat-conducting material is arranged between the insulating layer and the lens or between the insulating layer and the housing.

The body may include a two-component material including an electrically conducting layer that includes the matrix material and the conductive material, and a thermally conducting layer, preferably wherein the thermally conducting layer is in contact with at least part of the lens or the housing of the camera, and/or with at least part of a lens holder holding the lens.

One aspect of the present invention is directed to an interior heating device for a lens of a camera, wherein the heating device comprises at least one body in the form of a transparent coating or paint comprising at least one conductive material; and at least two electric contacts contacting the conductive material for applying an electric voltage to the conductive material. The conductive material may be conducting oxides, conducting polymers, carbon nanotubes, or the like. All other aspects of this embodiment are as described herein.

In another aspect, a system includes a heating device as described and a camera having a lens.

The system may include at least one power source, preferably a DC voltage source, adapted to supply a voltage to the two electric contacts, preferably the power source is controllable by a Pulse-Width Modulated, PWM, signal.

In yet another aspect, a rear view display device for a vehicle, preferably for a motor vehicle, includes at least one heating device as described and/or at least one system as described.

In a further aspect, a vehicle includes at least one rear view device as described.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIGS. 1A and 1B are diagrams illustrating a schematic front view and a schematic cross-sectional view from the side of a heating device.

FIGS. 1C and 1D are diagrams illustrating a schematic cross-section view and an isometric view of a heating device installed on a camera.

DETAILED DESCRIPTION

Figure 2A:
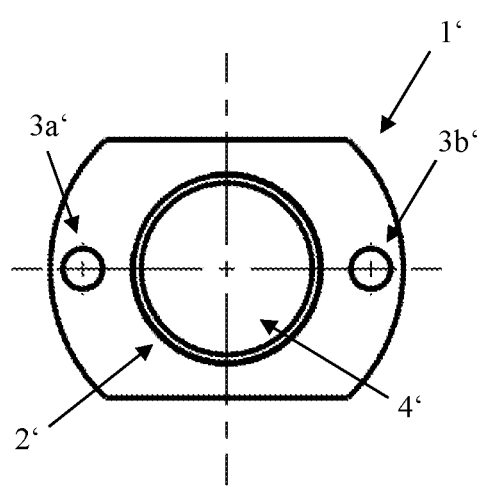
FIGS. 2A and 2B are diagrams illustrating a schematic front view and a schematic cross-sectional view from the side of a heating device.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In addition, it is to be understood that the phraseology and terminology employed herein are for the purpose of description and should not be regarded as limiting. For example, the use of a singular term, such as, "a" is not intended as limiting of the number of items. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

FIGS. 1A and 1B show a schematic front view and a schematic cross-sectional view from the side of a heating device 1 according to a first example. As shown in FIGS. 1A and 1B, the heating device 1 includes a body 2 that includes conductive material. In this example, the body 2 has the shape of a fastening nut and includes an annular opening 4. As shown in FIGS. 1A and 1B, two sections on two opposite ends of the essentially round body 2 could be flattened for using a wrench on the outer diameter of the body. However, the skilled person would know that the body 2 could also include all kinds of shapes on its outer periphery, for example the body 2 could include an essentially round, rectangular, and/or triangular shape. For example, the body 2 could be injection-molded in one single piece as a plastic component including conductive material. The skilled person would know that this could be achieved by adding any of the above-mentioned conductive particles, such as graphite or nano-particles to the plastic mixture before the plastic is molded.

The body 2 could have an internal resistance that is sufficiently high for heating up the body 2 when a voltage is applied across the two electric contacts 3a, 3b that are in contact with the conductive mass of the body 2. The skilled person would know that values in the range of 50 to 500Ω are appropriate for a voltage of 12 V, which is commonly used in motor vehicles. Also, the skilled person would know that the voltage could be applied to the two electric contacts 3a, 3b by a voltage source (not shown) that is pulse width modulated to control the resulting heat so that the camera lens does not get adversely affected by overheating. For example, the PWM signal could have a duty of 1:x which can reduce the electrical input power by factor 'x'.

The two electric contacts 3a, 3b are shown in the figures to be essentially located opposite each other. In the example that is shown in FIGS. 1A and 1B, the body 2 will have two resistance paths that are located in parallel to each other and which will have essentially half of the total resistance of the body 2. Therefore, the electrical input power will be $P=2V^2 *R$, where V is the applied voltage, and R the total resistance of the body 2.

For reducing/avoiding hotspots at the two electric contacts 3a, 3b, the electrical contacts 3a, 3b could be located deep inside the body 2, and/or more conductive material could be distributed around the electrical contacts 3a, 3b to increase the conductivity of the conductive material that is located around the electric contacts 3a, 3b.

FIGS. 1c and 1d show a schematic cross-section view and an isometric view of a heating device 1 installed on a camera 5. In the shown example, the cap of the lens holder 7 is made of essentially non-conductive plastic material, and the body 2 that includes the conductive material can transfer heat via the cap of the lens holder 7 to the lens 6 of the camera 5. However, the skilled person would know, for the case in which the cap of the lens holder 7 includes conductive material, such as for example metal, that an electrically insulating layer (not shown) could be arranged on the surface of the body 2 where the body 2 contacts the housing. For example, this could be done by arranging a thin foil including essentially isolating material between the two components. Optionally, heat-conducting paste could be additionally arranged between the isolating material and the camera-housing to improve the heat transfer to the lens 6. Alternatively, the body 2 could also include a two-component plastic material including an electrically conducting layer that includes the plastic and the conductive material, and a thermally conducting layer that is in contact with at least a part of the housing of the camera 5.

In an example illustrated in FIGS. 1C and 1D, the annular opening 4 includes a thread that is adapted to interact with a corresponding thread along the circumference of the housing of the camera 5. However, the skilled person would know that, alternatively, the annular opening 4 could also comprises at least one protrusion or groove adapted to interact with a corresponding groove or protrusion on the housing of the camera 5 for connecting the heating device 1 to the camera 5. Also, in a further embodiment, the heating device 1 could be also used for holding the lens 6 of the camera 5, which would make the lens holder 7 of the camera 5 that is shown in FIGS. 1C and 1D redundant.

Figure 2B:
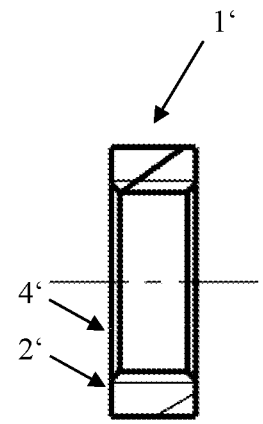
Figure 2C:
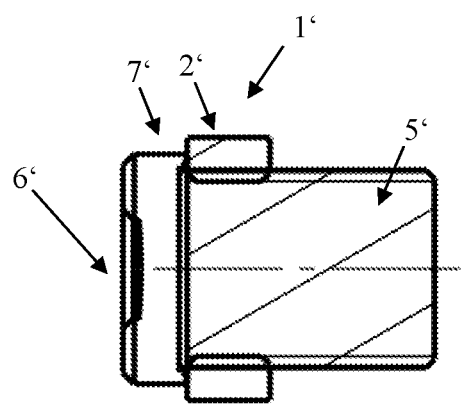
FIGS. 2C and 2D are diagrams illustrating a schematic cross-section view and an isometric view of a heating device installed on a camera.
Figure 2D:
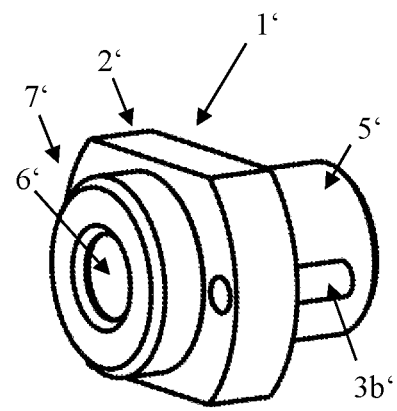

FIGS. 2A and 2B show a schematic front view and a schematic cross-sectional view from the side of a heating device according to a second example. The features of the heating device 1' correspond to the features of the heating device 1 that is shown in FIGS. 1A-D, however the heating device 1' of the second example is different in that the electrical contacts 3a', 3b' are arranged to extend essentially parallel to the housing of the camera 5'. The example of FIGS. 2A-D may allow a more compact design as best illustrated in FIGS. 2C and 2D where the heating device 1' is installed on a camera 5'.

Figure 3:
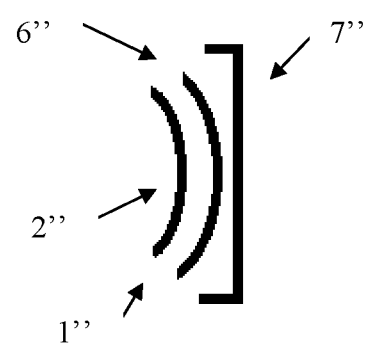
FIG. 3 is a diagram illustrating some of the components of a fish eye lens including the heating device.

FIG. 3 shows a simplified exploded view of some of the components of a 180° fish eye lens in an exemplary use of the heating device 1" according to a third example. The features of the heating device 1" correspond to the features of the heating device 1 that is shown in FIGS. 1A-D. In the simplified shown embodiment, the heating device 1" can be added directly behind the glass element of the lens 6", i.e. the heating device is directly attached to the lens of the camera. The heating device 1" has a form that is perfectly fitted to the form of the lens in order to provide sufficient heat without effecting the function of the lens 6". In this embodiment, the heating device may be in form of a transparent coating, non-transparent coating, free standing film, paint, ink or any other form described herein. Additional parts are contacts (not shown; may be in the form of the example described above) to enable power to reach the element. As power is also sent to a camera, this supply could also power up the heating device. The further features of this example may correspond to the features described in reference to the first example.

Figure 4A:
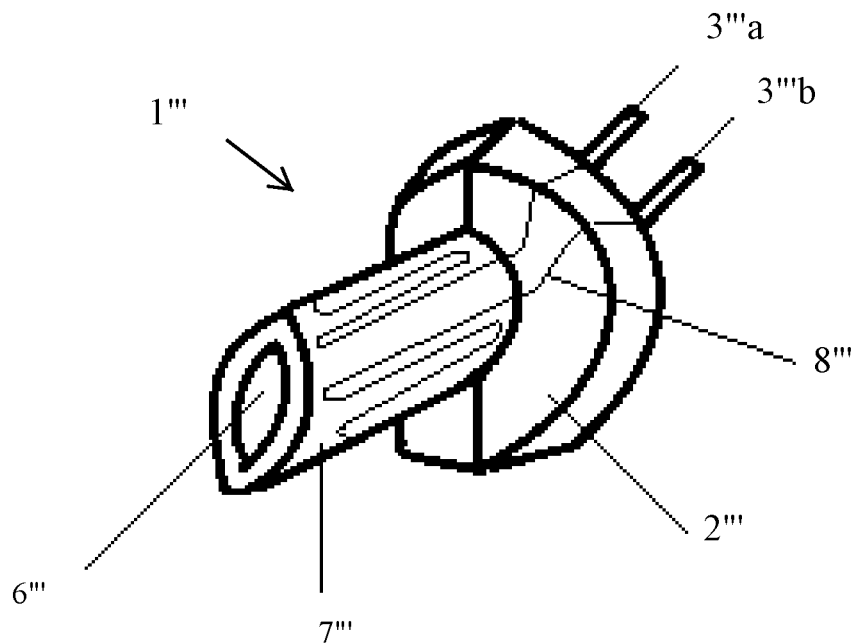
FIG. 4A is a diagram illustrating another example of a heating device.

FIG. 4A is a diagram illustrating another example of a heating device 1'''. Referring to FIG. 4A, the heating device 1''' includes a heating device body 2''' with a lens holder 7''' for a lens 6'''. In this example, the electrical contacts 3'''a and 3'''b project from a side of the body 2''' opposite to the lens holder 7''' and may run substantially parallel to the lens holder 7''' but in the opposite direction. The electrical contacts may also project in other directions as already described in reference with the examples in FIGS. 1A-2D and 2A-2D. The body 2''' and the lens holder 7''' are shown as a single unit, for example, formed in an injection molding process. In another example, the body 2''' and the lens holder 7''' are separate units adhered or attached to each other by one of many methods well known to a person of ordinary skill in the art.

Figure 4B:
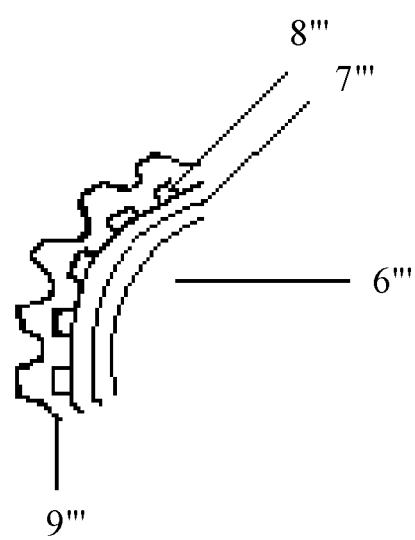
FIG. 4B is a diagram illustrating a schematic sectional view of the lens of the heating device of FIG. 4A.

FIG. 4B is a diagram illustrating a schematic sectional view of the lens of the heating device of FIG. 4A showing the lens 6''', the lens holder 7''', a heating wire 8''', and a coating 9'''. Referring now to FIG. 4B together with FIG. 4A, in this example, conductive material may be provided by the one or more heating wires 8''' which may be injection-molded onto the body 2''' and/or injected into the body 2'''. At least in the example of injection molding the heating wires 8''' onto the body 2''', a coating 9''', such as an electrically insulating layer, may be applied to the surface of the lens holder 7'''. The lens 6''' may provide a lens barrel and/or may include multiple individual lenses arranged along the lens holder 7''', one after the other. In this example, the lens holder 7''' can have a tubular form although other shapes are not beyond the scope of the present disclosure.

Still referring to FIGS. 4A and 4B, in an example, the lens holder 7''' with the heating wires 8''' may be a molded interconnect device (MID), i.e., an injection-molded thermoplastic part with integrated electronic circuit traces. MID technology combines the plastic substrate/housing with circuitry into a single part by selective metallization. Laser Direct Structuring (LDS), hot stamping or selective metallization, which can be achieved by printing of conductive traces onto the surface of the thermoplastic part, are preferred.

It should be appreciated that the materials, characteristics, and configurations used for the heating device 1''' can be the same or similar to the heating devices 1, 1'. 1" described for the above examples. For example, this includes the conductive material, connectivity of the heating device 1''' to the lens and/or housing of the camera, conductivity, power, voltage, resistance characteristics, among others. In general, the further features of this example may correspond to the features described in reference to the above examples.

It has been advantageously found that the heating device may be universally used with many different camera types. In case of an interior heating device, the heating device may have a form that is perfectly adapted to the form of the lens or the requirements of the interior design of the camera. In case of an exterior heating device, screwing the heating device like a fastening nut onto the external threading of a camera housing allows to quickly and safely connect the heating device with the camera housing. In fact, any camera having an external thread, or other suitable connecting means can be modularity fitted with the heating device.

Because the body of the heating device includes a compound material, where conductive material is dispersed inside a matrix material, the camera lens can be more evenly heated which in turn reduces wear due to thermal stress. By varying the position of the heating device on the lens or on the housing of the camera relative to the camera lens, the best position for heating the camera lens can be easily found.

By manufacturing the body of the heating device from a two-component matrix material, the conductive material which is responsible for the heating can be electrically isolated, for example from the camera housing so as to efficiently avoid malfunction or a short-circuit.

Also, by splitting the thread in the opening of the body by introducing at least in part non-conductive material for realizing the two electric contacts allows to directly connect the heating device to a power line at the inside of the camera housing.

If the heating device is used as lens holder of the camera, the heating device can be in direct contact with the lens, which enhances the heat transfer to the lens. Also, this makes the use of conventional lens holders redundant. Hence, the heating device can serve a dual purpose, i.e. to heat the lens, while also holding the lens.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1, 1', 1", 1''': heating device
2, 2', 2", 2''': body 3a, 3b, 3a', 3b', 3a''', 3b''': electric contacts
4, 4': annular opening
5, 5': camera
6, 6', 6'', 6''': lens
7, 7', 7'', 7''': lens holder
8''': heating wire
9''': coating

What is claimed is:

1. A heating device for a lens of a camera, comprising:
at least one body comprising at least one conductive mass, wherein the at least one body forms at least one of a transparent coating, a non-transparent coating, a free standing film, a paint, or a bulk composite material;
at least two electrical contacts contacting the conductive mass for applying an electrical voltage to the conductive mass; and
a pulse width modulated voltage source coupled to the at least two electrical contacts, the pulse width modulated voltage source configured to prevent overheating of the lens of the camera;
wherein the heating device is attachable to and detachable from a housing of the camera.

2. The heating device of claim 1, further comprising a lens holder which is provided as at least one of an injection molded single unit with the heating device body or a separate unit attached to the heating device body.

3. The heating device of claim 1, wherein the electrical contacts project from a side of the body opposite to a lens holder of the body.

4. The heating device of claim 1, wherein the conductive mass is an injection-molded heating wire that is coupled to the surface of the body.

5. The heating device of claim 1, further comprising a coating comprising an electrically insulating layer applied to a surface of a lens holder of the body.

6. The heating device of claim 1, wherein a lens holder of the body comprises a tubular shape with at least one of a lens barrel and multiple individual lenses arranged along the lens holder.

7. The heating device of claim 1, wherein the conductive mass is a heating wire which is a molded interconnect device (MID) provided by at least one of Laser Direct Structuring (LDS), hot stamping, and selective metallization.

8. The heating device of claim 1, wherein the conductive mass comprises carbon fibers, graphite, carbon nanotubes, carbon nanohorns, carbon black, graphene, graphene nanoplatelets, metal particles, conductive polymers, or mixtures thereof, and is dispersed in a matrix material, the matrix material and the conductive material forming an essentially homogenous conductive mass.

9. The heating device of claim 1, wherein the heating device is adapted to be added directly to a glass element of the lens, or wherein the heating device is adapted to be added to a non light-transmissive part of the lens.

10. The heating device of claim 1, wherein
the conductive mass is distributed substantially equally inside the body, or
more conductive material is distributed near regions where the two electrical contacts are arranged compared to other regions of the body.

11. The heating device of claim 1, wherein the at least two electrical contacts are injection-molded electrical contacts.

12. A heating device for a lens of a camera, comprising:
at least one body with a two-component material including an electrically conducting layer and a thermally conducting layer being in contact with at least one of the lens, the housing of the camera, and a lens holder holding the lens;
at least two electric contacts contacting the electrically conductive layer for applying an electric voltage thereto; and
a pulse width modulated voltage source coupled to the at least two electrical contacts, the pulse width modulated voltage source configured to prevent overheating of the lens of the camera;
wherein the heating device is attachable to and detachable from a housing of the camera.

13. The heating device of claim 12, further comprising a lens holder which is provided as at least one of an injection molded single unit with the heating device body or a separate unit attached to the heating device body.

14. The heating device of claim 12, wherein the electrical contacts project from a side of the body opposite to a lens holder of the body.

15. The heating device of claim 12, wherein the conductive layer is an injection-molded heating wire that is coupled to the surface of the body.

16. The heating device of claim 12, further comprising a coating comprising an electrically insulating layer applied to a surface of a lens holder of the body.

17. The heating device of claim 12, wherein a lens holder of the body comprises a tubular shape with at least one of a lens barrel and multiple individual lenses arranged along the lens holder.

18. The heating device of claim 12, wherein the conductive layer is a heating wire which is a molded interconnect device (MID) provided by at least one of Laser Direct Structuring (LDS), hot stamping, and selective metallization.

19. The heating device of claim 12, wherein the conductive layer comprises carbon fibers, graphite, carbon nanotubes, carbon nanohorns, carbon black, graphene, graphene nanoplatelets, metal particles, conductive polymers, or mixtures thereof, and is dispersed in a matrix material, the matrix material and the conductive layer forming an essentially homogenous conductive mass.

20. The heating device of claim 12, wherein the heating device is adapted to be added directly to a glass element of the lens, or wherein the heating device is adapted to be added to a non light-transmissive part of the lens.

21. The heating device of claim 12, wherein
the conductive layer is distributed substantially equally inside the body, or more conductive material is distributed near regions where the two electrical contacts are arranged compared to other regions of the body.

22. A heating device for a lens of a camera, comprising:
at least one body comprising:
at least one conductive material;
at least one electrically insulating layer arranged on a surface of the body, with the surface of the body contacting either the lens or a housing of the camera; and
a heat-conducting material arranged between the insulating layer and the lens; and
at least two electric contacts contacting the electrically conductive material for applying an electric voltage thereto; and
a pulse width modulated voltage source coupled to the at least two electrical contacts, the pulse width modulated voltage source configured to prevent overheating of the lens of the camera;

wherein the heating device is attachable to and detachable from a housing of the camera.

23. The heating device of claim 22, further comprising a lens holder which is provided as at least one of an injection molded single unit with the heating device body or a separate unit attached to the heating device body.

24. The heating device of claim 22, wherein the electrical contacts project from a side of the body opposite to a lens holder of the body.

25. The heating device of claim 22, wherein the conductive material is an injection-molded heating wire that is coupled to the surface of the body.

26. The heating device of claim 22, further comprising a coating comprising an electrically insulating layer applied to a surface of a lens holder of the body.

27. The heating device of claim 22, wherein a lens holder of the body comprises a tubular shape with at least one of a lens barrel and multiple individual lenses arranged along the lens holder.

28. The heating device of claim 22, wherein the conductive material is a heating wire which is a molded interconnect device (MID) provided by at least one of Laser Direct Structuring (LDS), hot stamping, and selective metallization.

29. The heating device of claim 22, wherein the conductive material comprises carbon fibers, graphite, carbon nanotubes, carbon nanohorns, carbon black, graphene, graphene nanoplatelets, metal particles, conductive polymers, or mixtures thereof, and is dispersed in a matrix material, the matrix material and the conductive material forming an essentially homogenous conductive mass.

30. The heating device of claim 22, wherein the heating device is adapted to be added directly to a glass element of the lens, or wherein the heating device is adapted to be added to a non light-transmissive part of the lens.

31. The heating device of claim 22, wherein
the conductive material is distributed substantially equally inside the body, or
more conductive material is distributed near regions where the two electrical contacts are arranged compared to other regions of the body.

32. A method of heating a lens of a camera comprising:
determining a heating level that would adversely affect the lens;
applying a voltage across two electrical contacts;
coupling the electrical contacts to a heating device body comprising conductive material;
generating heat within the heating device body based on the voltage across the two electrical contacts;
limiting the voltage across the two electrical contacts by pulse width modulation to a level that would result in an amount of heat that equals the heating level;
transferring the heat from the heating device body to a lens holder that is coupled to and supports the lens; and
transferring the heat from the lens holder to the lens.

33. The method of claim 32, further comprising coupling the body to a housing of the camera.

34. The method of claim 32, wherein the conductive material is a heating wire which is a molded interconnect device (MID) provided by Laser Direct Structuring (LDS), hot stamping, or selective metallization.

35. A method of heating a lens of a camera comprising:
applying a voltage across two electrical contacts;
coupling the electrical contacts to a heating device body comprising conductive material;
generating heat within the heating device body based on the voltage across the two electrical contacts;
transferring the heat from the heating device body to a lens holder that is coupled to and supports the lens; and
transferring the heat from the lens holder to the lens;
wherein the electrical contacts are coupled to the heating device body by injection molding.

36. A method of heating a lens of a camera comprising:
applying a voltage across two electrical contacts;
coupling the electrical contacts to a heating device body comprising conductive material;
generating heat within the heating device body based on the voltage across the two electrical contacts;
transferring the heat from the heating device body to a lens holder that is coupled to and supports the lens; and
transferring the heat from the lens holder to the lens;
wherein the electrical contacts are coupled to the heating device body by injecting the electrical contacts into the heating device body.

* * * * *